UNITED STATES PATENT OFFICE.

ARTHUR HAROLD LLOYD, OF COVENTRY, ENGLAND.

LATHE.

1,398,731.     Specification of Letters Patent.     Patented Nov. 29, 1921.

Application filed May 5, 1920. Serial No. 378,952.

*To all whom it may concern:*

Be it known that I, ARTHUR HAROLD LLOYD, a subject of the King of England, residing at Coventry, in the county of Warwick, England, have invented certain new and useful Improvements in Lathes, of which the following is a specification.

This invention relates to lathes or like machine tools upon which are employed self-opening die-heads, and it has for its principal object to provide an improved method of controlling the operative connection established between the die-head and the lead screw, so that thereby the time required for machining certain kinds of work is substantially reduced, thus resulting in a correspondingly increased output with a consequent reduction in manufacturing costs.

The kind of work to which the invention is especially applicable is that in which a gap separates two similarly-pitched threaded portions of a member upon which the relative dispostion of the threads upon the two parts must be such that they are in helical register, with one another. It will be evident therefore that when such threaded parts are produced in a turret or like lathe the ordinary self-feeding action of the die-head cannot be employed owing to the gap between the two portions of the threads on the stay, and the present invention therefore embodies certain features, which besides providing for the automatic operative connection of the die-head with the lead screw, also insure subsequent automatic disconnection therefrom and the simultaneous opening of the die-head when the threading operation is completed.

According to this invention, in a lathe or like tool having a saddle and lead screw, there are provided in combination, a resiliently acting bolt or plunger (preferably carried by the saddle) adapted at a predetermined point in the travel of the saddle to engage the turret slide, or other member carrying the die-head, so that the latter travels with the saddle; and a gap or a like interruption in the lead screw, which gap is adapted, at the completion of the threading process to disengage the saddle-nut and thus automatically to bring the saddle to rest, the die-head being opened simultaneously by the known means.

The manner of carrying out the invention upon a turret lathe as arranged for the manufacture of boiler stays is shown in the accompanying drawings, in which—

Like letters indicate like parts throughout the drawings.

Figure 1:
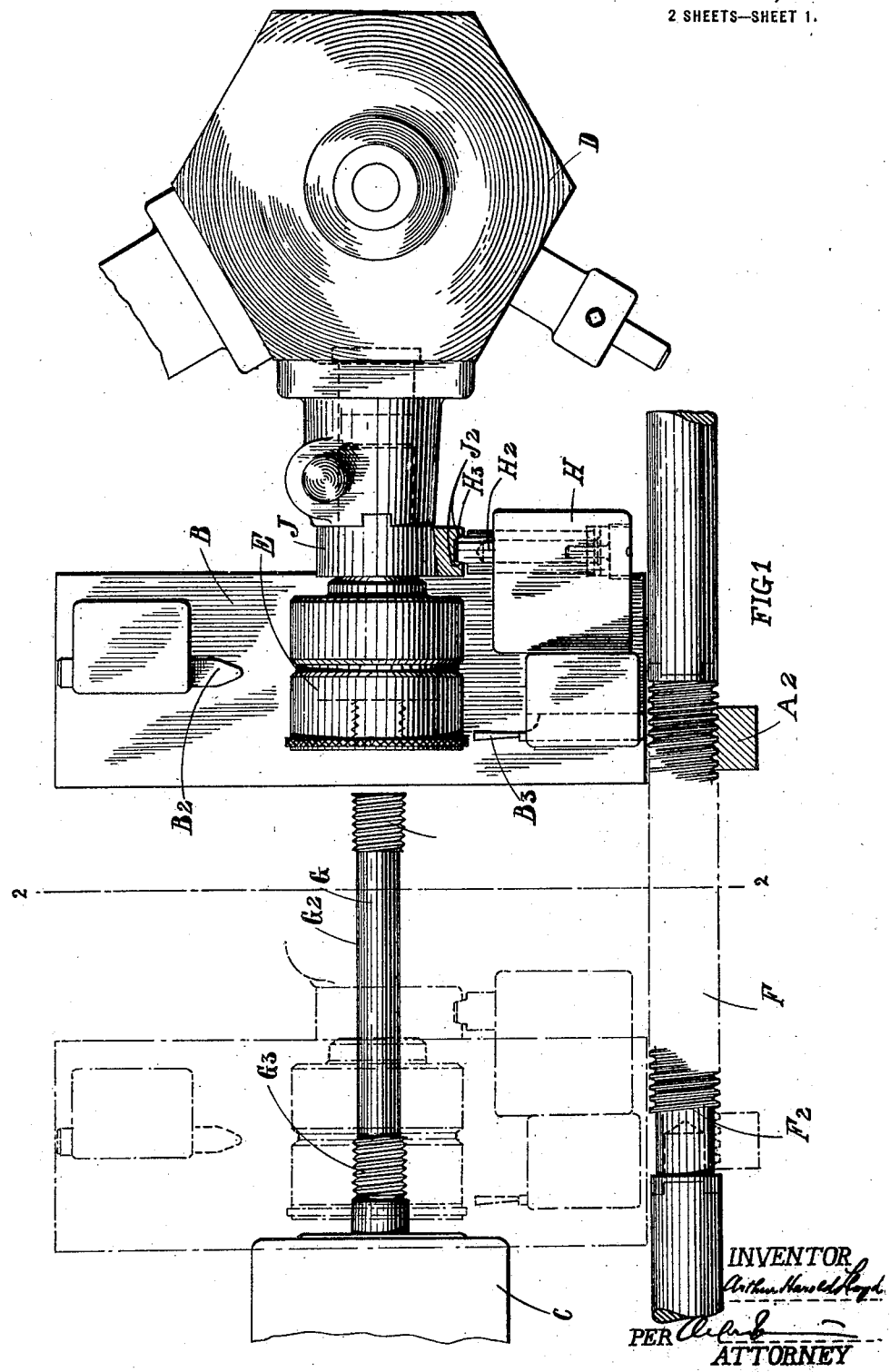
Figure 1 is a plan view.
Figure 2:
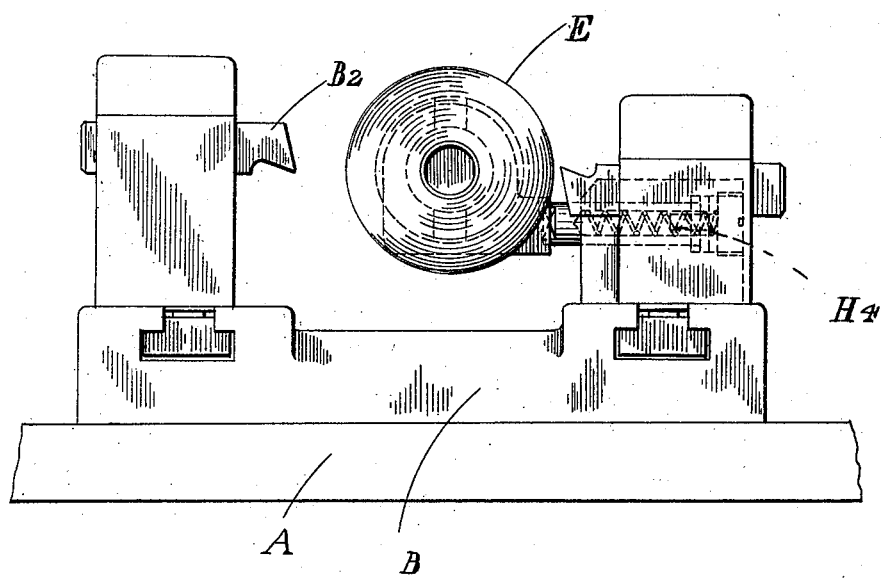
Fig. 2 is an end view with the part on the left of the line 2—2 in Fig. 1 removed.

The saddle of the lathe is indicated at A; the cross slide at B; the chuck gripping the stock in the hollow mandrel at C; the turret at D; and the self-opening die-head carried by it at E. A leader or lead-screw F which is interchangeable with others for use with the lathe in the known manner has a gap or equivalent interruption or a termination of its thread at $F^2$, at a position adapted to cause complete disengagement of the lead-screw or saddle nut at the completion of the threading operation.

At the back of the slide B is an inverted tool $B^2$ for forming the reduced part $G^2$ situated between the threaded parts $G^3$ of the stay G; and on the front of the slide is a parting-off tool $B^3$ for the final operation on the stay.

Upon the cross slide B is mounted a block H whose position is adjustable lengthwise and crosswise of the lathe bed. This block carries a plunger $H^2$ which is, by the agency of a spring $H^4$, resiliently thrust outward for a limited distance toward the longitudinal center line of the lathe. The nose $H^3$ of the plunger is slightly beveled on its vertically disposed sides to facilitate its engagement with a notch $J^2$ in a member J carried by the housing of the self-opening die-head E mounted in the turret D. As usual the turret is carried upon a slide adapted to be moved along the bed of the machine.

In machining a boiler stay of the kind employed around fireboxes and the like, and having a gap between its threaded parts, the stock is fed through the hollow lathe-mandrel in the known manner, and the first operation is that of forming the reduced portion $G^2$ constituting the gap between the threaded parts $G^3$ of the stay G, by means of the tool $B^2$ on the back part of the cross slide B. When this operation is completed, the self-opening die-head E mounted upon the turret D is brought into position at the free end of the stay. The saddle A is then adjusted lengthwise along the lathe-bed so that the nose $H^3$ of the plunger $H^2$, which, under the action of its spring $H^4$, is adapted to move radially inward toward the rotational axis of the lathe, is disposed so that, relatively to the direction of the saddle movement, it points somewhat to the rear of the notch $J^2$ in the member J upon the die-head housing when the die-head is in position to engage the end of the stay G. The usual saddle-nut $A^2$ is then engaged with the lead screw F and the cross slide B is fed inwardly. During this in-movement of the cross slide the plunger $H^2$, by coming into contact with the rear side wall of the notch $J^2$ in the member J, is forced back into the block H against its spring loading. As the saddle A commences to move, carrying with it the plunger $H^2$, the nose $H^3$ of the latter comes into register with the notch $J^2$ and is thrust into it by means of the spring $H^4$ so that the die-head E is thus operatively connected to the saddle A and thereafter is moved along with it by the lead screw F at the appropriate rate of feed.

The plunger block H carrying the plunger $H^2$ is mounted on the front of the cross slide of the lathe and thus the block and the plunger with it can be moved inward by the ordinary screw transverse feed. In some makes of capstan lathe the cross slide is geared up to the lead screw mechanism in such a manner that when the usual half nut is engaged with the screw an inward movement of the cross slide amounting to about $\frac{1}{4}''$ takes place, effecting the engagement of the plunger with the notched member J. This well known construction, however, forms no part of my invention.

As soon as the die-head E completes the first threaded part $G^3$ of the stay G and arrives at the reduced portion $G^2$, the lathe is speeded up in any known or convenient manner either by hand-controlled means or automatically, until the gap portion $G^2$ has been traversed by the die-head, so that no time may be wasted in this movement. Just before starting to cut the second part $G^3$ of the thread, the speed of the lathe is reduced to the normal and the operation of threading is then continued as in the first case. Immediately, however, the predetermined extent of this is attained, the saddle-nut $A^2$ has arrived at the gap $F^2$ in the lead screw F whereby the travel of the saddle A is arrested at the moment at which the die-head E is arranged to be opened by the known automatic means, which are appropriately adjusted for this purpose. After this, the cross slide B is moved to cause the plunger H to disengage the notched member J, the die-head E is withdrawn by a rearward movement of the turret slide, the parting-off tool $B^3$ is employed, and the machining operation is then completed.

It will thus be seen that the invention provides simple and automatic means for carrying out this kind of threading operation in such manner that both the threaded parts $G^3$ are in helical register with one another, while by the provision of the gap $F^2$ in the lead screw F no danger of injury to the lathe or to the work arises in the operation of opening the die-head and it will also be seen that the whole of the machining operation can be carried out with considerable rapidity and with a minimum of wasted time.

It will be evident that the foregoing combination of parts can equally well be provided either upon a turret lathe, in which the movement of engagement of the saddle-nut also acts to feed inwardly the cross slide thereon, or upon an ordinary screw-cutting lathe in which the action involves two distinct operations.

What I claim as my invention and desire to secure by Letters Patent of the United States of America is:—

1. In a lathe, a saddle, a self-opening die-head carried thereon, a saddle-nut carried by said saddle, and a lead screw adapted to be engaged by said saddle-nut, and having a gap which interrupts the threads formed upon it, thereby to automatically disengage the saddle nut as it arrives in the gap.

2. In a lathe, a main saddle, a saddle-nut carried by said saddle, a lead screw adapted to be engaged by said saddle-nut and having a gap which interrupts the threads formed upon it thereby to automatically disengage the saddle nut as it arrives in the gap, a secondary saddle distinct from the first saddle, a self-opening die-head carried upon said secondary saddle, and means adapted automatically at a pre-determined point in the travel of the main saddle to establish a tractive engagement of said main saddle with said secondary saddle.

3. In a lathe, a main saddle, a saddle-nut, carried by said saddle, a lead screw adapted to be engaged by said saddle-nut and having a gap which interrupts the threads formed upon it thereby to automatically disengage the saddle nut as it arrives in the gap, a secondary saddle distinct from the first saddle, a self-opening die-head carried upon said secondary saddle, a resiliently acting bolt carried upon one of said saddles, and a co-operating member carried upon the other saddle and adapted to be engaged by the aforesaid resiliently acting bolt at a pre-determined relative position of the two saddles.

In testimony whereof I have signed my name to this specification in the presence of two subscribing witnesses.

ARTHUR HAROLD LLOYD.

Witnesses:
 ALBERT BROWN,
 ANNIE LOUISE WADE.